(12) United States Patent
Droubie

(10) Patent No.: US 7,599,614 B2
(45) Date of Patent: Oct. 6, 2009

(54) CAMERA APPARATUSES, SYSTEMS AND METHODS FOR USE WITH MARINE PROPULSION MECHANISMS

(75) Inventor: Mark R. Droubie, Sebastian, FL (US)

(73) Assignee: Honda Motor Co., Ltd, Tokyo (JP)

( * ) Notice: Subject to any disclaimer, the term of this patent is extended or adjusted under 35 U.S.C. 154(b) by 407 days.

(21) Appl. No.: 11/378,728

(22) Filed: Mar. 17, 2006

(65) Prior Publication Data

US 2007/0217773 A1    Sep. 20, 2007

(51) Int. Cl.
*G03B 17/08* (2006.01)
(52) U.S. Cl. ........................................ 396/25; 396/419
(58) Field of Classification Search ............. 396/25–29, 396/419; 348/81; 359/507, 511–513
See application file for complete search history.

(56) References Cited

U.S. PATENT DOCUMENTS

| 2,396,267 | A | | 3/1946 | Johnson |
| 2,906,181 | A | * | 9/1959 | Hofstra ........................ 396/10 |
| D225,901 | S | | 1/1973 | Yagi et al. |
| 3,759,151 | A | | 9/1973 | Metz |
| 3,942,372 | A | | 3/1976 | Gonzalez et al. |
| 4,536,789 | A | | 8/1985 | Bains |
| 4,784,624 | A | | 11/1988 | Yoshida |
| 4,995,010 | A | | 2/1991 | Knight |
| 6,064,824 | A | | 5/2000 | Rink |
| 6,873,902 | B2 | | 3/2005 | Welch |
| 2001/0048468 | A1 | | 12/2001 | Fantone et al. |
| 2003/0214579 | A1 | * | 11/2003 | Iddan .......................... 348/81 |

* cited by examiner

*Primary Examiner*—Bot L LeDynh
(74) *Attorney, Agent, or Firm*—Jenkins, Wilson, Taylor & Hunt, P.A.

(57) ABSTRACT

Camera apparatuses, systems and methods are provided having particular application with marine propulsion mechanisms. In one aspect, a camera apparatus can include a housing that can have an external airfoil configuration. The camera apparatus can be mounted on a marine propulsion mechanism, such as a marine outboard engine, and can be used to see images of and monitor the engine. A water intake on the outboard engine can be particularly viewed and monitored, even during operation of the engine with a boat at high speeds.

28 Claims, 8 Drawing Sheets

CAMERA APPARATUSES, SYSTEMS AND METHODS FOR USE WITH MARINE PROPULSION MECHANISMS

TECHNICAL FIELD

The subject matter disclosed herein relates generally to cameras, and more particularly, to camera apparatuses, systems and methods having particular applicability for use with marine propulsion mechanisms.

BACKGROUND ART

Marine propulsion mechanisms, such as outboard engines used with boats, typically require water for cooling of the engines during operation. As such, a marine outboard engine typically includes a water intake near the bottom of the engine where water can enter through a screen and be pumped through the engine for cooling. Problems can occur where water fails to enter the water intake during operation of the outboard engine. Cavitation or turbulence that can be created during operation of an outboard engine at higher speeds can affect the flow of water into the water intake. During different types of operation of an outboard engine, such as at varying speeds, the position of the outboard engine can vary with respect to the water level, and this positioning can also affect the flow of water into the water intake. Also, cavitation can cause paint and metal erosion.

SUMMARY

The subject matter disclosed herein provides novel camera apparatuses, systems and methods with particular application for use in association with marine propulsion mechanisms such as outboard engines for boats.

It is an object of the subject matter disclosed herein to provide such novel camera apparatuses, systems, and methods. This object is achieved at least in whole or in part by the subject matter disclosed herein. Other objects will become evident as the description proceeds when taken in connection with the accompanying drawings as described hereinbelow.

DETAILED DESCRIPTION

In accordance with the present disclosure, novel camera apparatuses, systems and methods are provided. As described further herein, the camera apparatuses, systems and methods according to the present disclosure can have particular application for use in association with, for example and without limitation, marine propulsion mechanisms such as outboard engines. It is envisioned though that the camera apparatuses, systems and methods according to the present disclosure can have applications for other uses as well.

Figure 1A:
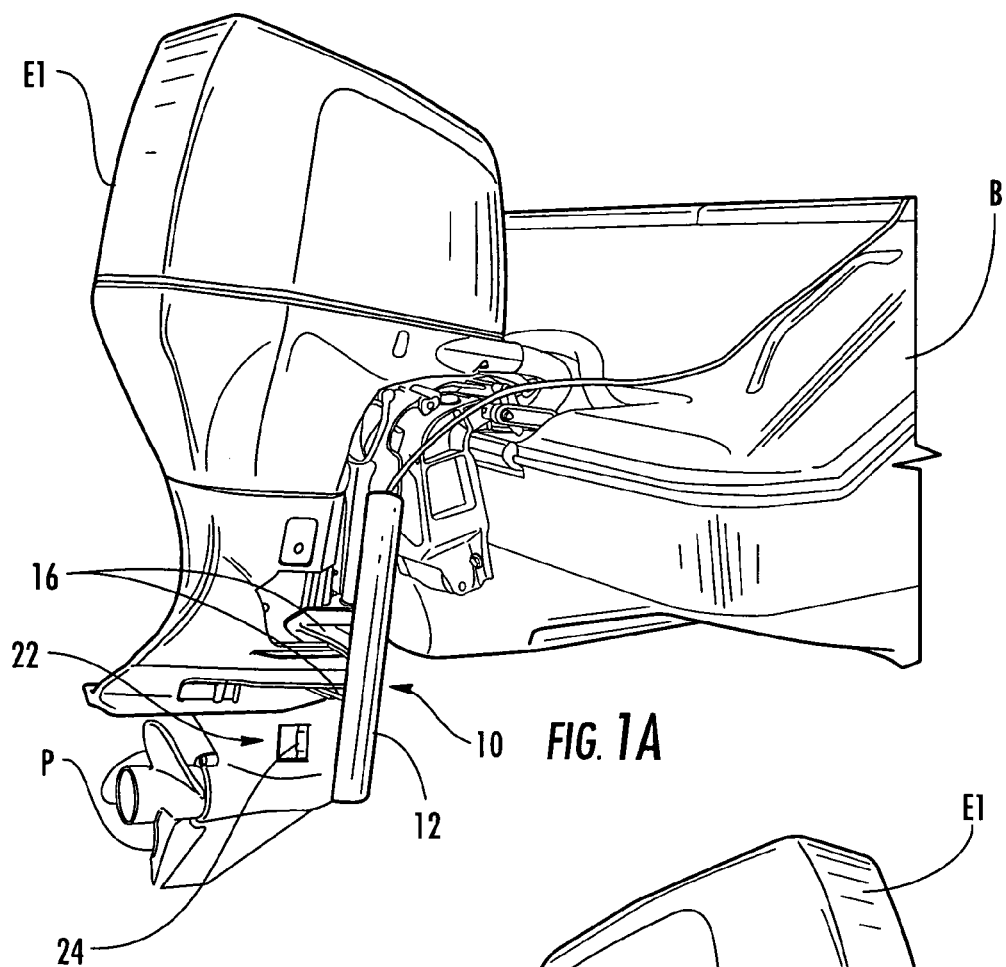
FIGS. 1A and 1B of the drawings are perspective views of an embodiment of a right-side camera apparatus used in association with an outboard engine of a boat according to one example of the present disclosure.
Figure 1B:
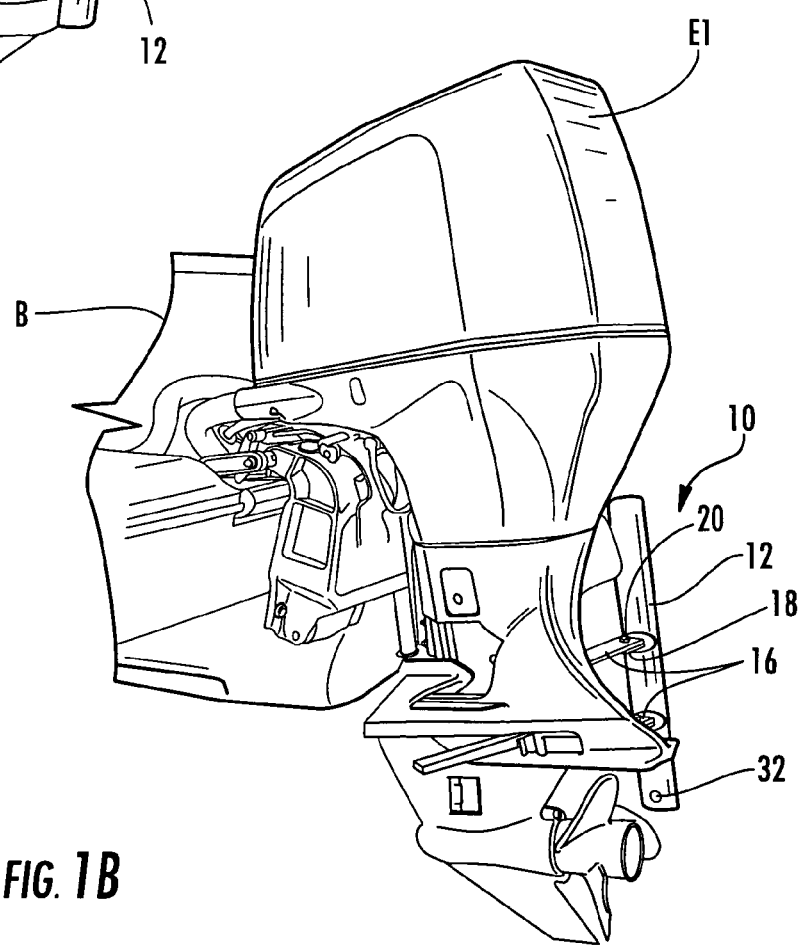

One example of particular application of a camera apparatus, system and method according to the present disclosure is use with marine propulsion mechanisms such as outboard engines. As can be appreciated by those of skill in the art knowledgeable of the problems cavitation can cause, it can be desirable to monitor, such as by visualization as disclosed herein, cavitation at any underwater area, such as for example a gear casing, a propeller, bolts, sharp edges, etc. Referring to FIGS. 1A and 1B of the drawings, one example of an embodiment of a right-side camera apparatus according to the present disclosure is shown. Camera apparatus generally designated 10 is shown attached to the right side of an outboard engine E1 of a boat B. Camera apparatus 10 can also be attached to the left side of outboard engine E1. Camera apparatus 10 can comprise a housing 12 that can hold a camera as described further below in order to provide camera images of items within a field of visible view or exposure of camera 14.

Camera housing 12 can be of any suitable shape and/or configuration for holding a camera such as camera generally designated 14 (shown in FIGS. 4 and 5) that can have a field of visual exposure through aperture 32. As one example, housing 12 of camera apparatus 10 can comprise an elongated exterior airfoil configuration, such as that shown in FIGS. 1A and 1B. Any specific airfoil configuration could be utilized as desired, although it is envisioned that a less blunt airfoil can be beneficial for higher speed operations in water. The thickness of the airfoil with respect to the chord length can also be of any suitable and desired measurement. For example, the thickness can be about 10% of the chord length. Additionally, any other non-airfoil configuration could also be used for the shape of housing 12 of camera apparatus 10. Any suitable material of construction, such as for example, extruded aluminum, can be used for housing 12.

In order to secure camera apparatus 10 into a desired position, mounting arms such as mounting arms 16 can be used with camera apparatus 10 to mount camera apparatus 10 on engine E1. Camera apparatus 10 can be mounted on engine E1 by use of any suitable structures such as mounting arms 16 for maintaining camera apparatus 10 in a desired position. It is envisioned that camera apparatus 10 can be mounted on either side of engine E1 and can be mounted on engine E1 by utilizing existing and original components on engine E1, such as existing bolts or other fasteners used on engine E1. Additionally, camera apparatus 10 can be mounted on engine E1 so as to be either fixed securely in position with respect to engine E1 or so as to be securely positioned to E1 while allowing a desired amount, which can be a small amount, of rotational movement. For example, camera apparatus 10 can be secured and maintained in a desired position with respect to engine E1 with mounting arms 16 being pivotally adjustable as allowed by attachment of mounting arms 16 to mounting platforms 18 by bolts 20. When in use where boat B is operating at a high speed, housing 12 of camera apparatus 10 can be positioned as desired with respect to the water flow. Maintaining camera apparatus 10 in a tilted and slightly angled position, such as for example five (5) degrees, into the path of water flow to be slightly off or parallel with the direction of water flow can minimize or eliminate cavitation from camera apparatus 10. While pointing camera apparatus 10 straight back where the camera view point would be normal to the direction of flow, such as for lower speed operations, may be suitable for some situations, pointing camera apparatus 10 straight back rather than at an angle during operation of boat B at higher speeds can cause viewing problems for camera apparatus 10.

Camera apparatus 10 can be utilized to provide camera images of anything within the field of view or visual exposure of camera 14. The embodiment of camera apparatus 10 shown in FIGS. 1A and 1B of the drawings can be utilized for providing camera images of a water intake generally designated 22 of engine E1 as shown in FIG. 1A. As known to those of skill in the art, water intake 22 can utilize a screen, such as screen 24, as water intake 22 can be used for ingress of water into and for cooling engine E1. As shown in FIG. 1A, water intake 22 is shown in an upstream position ahead of propeller P and in a position where during operation of engine E1 for propelling or driving boat B, water intake 22 would typically be positioned under water. Although camera apparatus 10 is described herein as having particular use for providing camera images of water intake 22, it is also envisioned according to the present disclosure that camera apparatus 10 can be used for providing camera images of any other structures or areas, such as for providing camera images of a gear case, a propeller such as propeller P, or even any attachment that may be used in association with engine E1.

Figure 2:
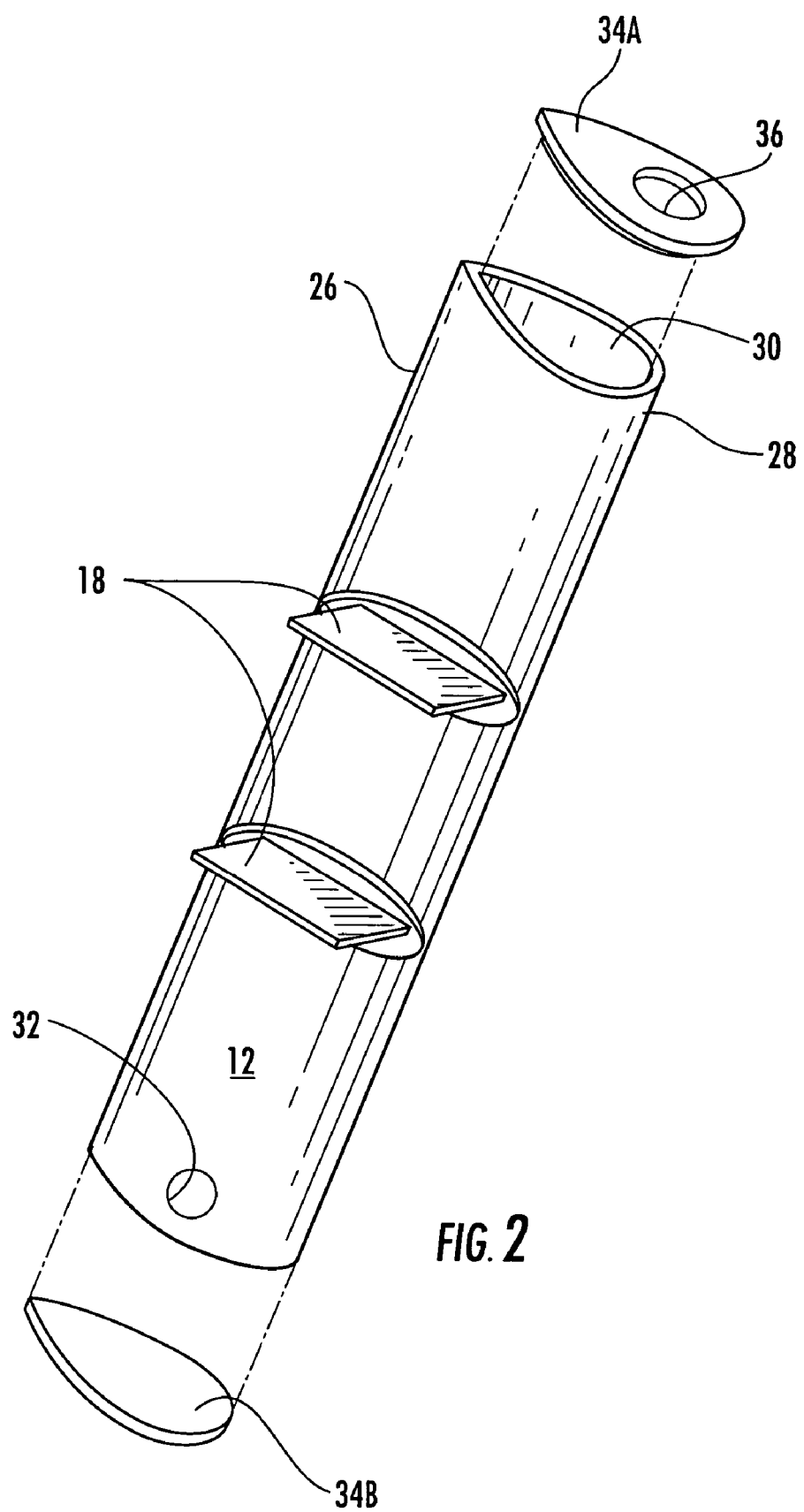
FIG. 2 of the drawings is a partially exploded, isolated perspective view of a camera housing of a left-side camera apparatus according to the present disclosure.

Referring now to FIG. 2 of the drawings, housing 12 of camera apparatus 10 is shown for left-side attachment to an engine as camera apparatus 10 comprises mounting platforms 18 that can be welded onto housing 12. As mentioned previously, housing 12 can comprise an external airfoil configuration as shown in FIG. 2. For example, housing 12 can comprise a leading edge 26 and an opposite, curved surface 28. Housing 12 can be elongated and have at least a portion of its interior as hollow space surrounded by an interior wall 30. Aperture 32 can be defined at any suitable location of camera apparatus 10 such that aperture 32 is open to the exterior of camera apparatus 10 and allows a camera within housing 12 to have a field of visual exposure or view external to housing 12. Aperture 32 is shown in FIGS. 1B and 2 on the left side surface of camera apparatus 10, but aperture 32 can also be on the opposite side surface of housing 12. End caps, such as top and bottom end caps 34A and 34B, respectively, can be used to cap or plug or otherwise fit onto the top and bottom ends of housing 12. Top end cap 34A can define an opening such as opening 36 for routing structures such as conduit structures described below through opening 36.

Figure 3:
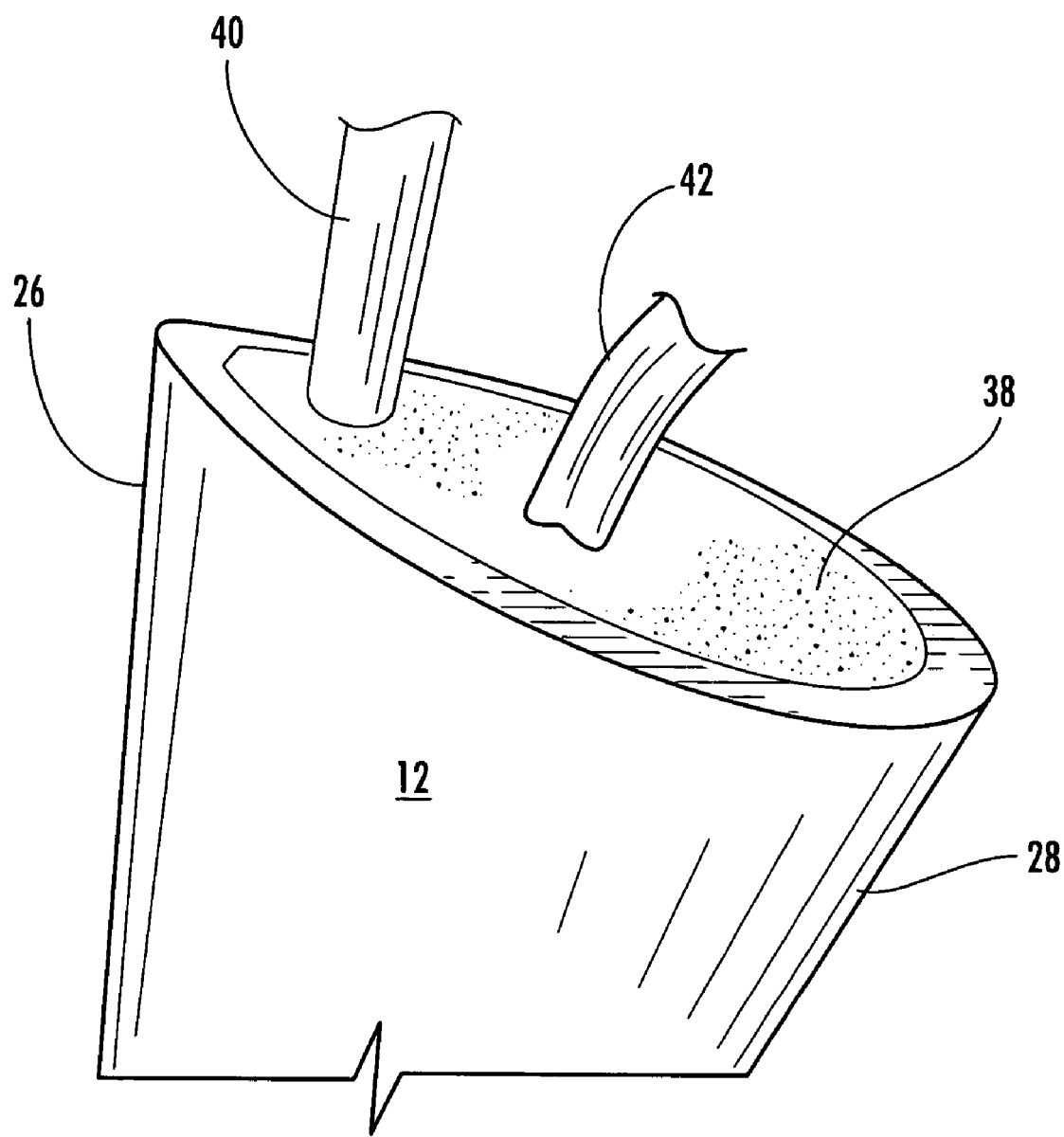
FIG. 3 of the drawings is an end view of one embodiment of a camera housing of a camera apparatus according to the present disclosure.

As shown in FIG. 3, the interior of housing 12 can be filled with an epoxy 38 for purposes of protecting a camera within housing 12 from elements such as water. Any suitable conduits or other structures can extend through epoxy 38. For example, an air vent such as air tube 40 can extend through epoxy 38 in the interior of housing 12 in order to provide equalized pressure within the interior of housing 12 as well as to remove moisture. An electrical connector such as electrical connector 42 can also extend through epoxy 38 and into the interior of housing 12 and can connect with a camera within housing 12 for providing power to the camera and for electrical connection of a camera therein for image transfer.

Figure 4:
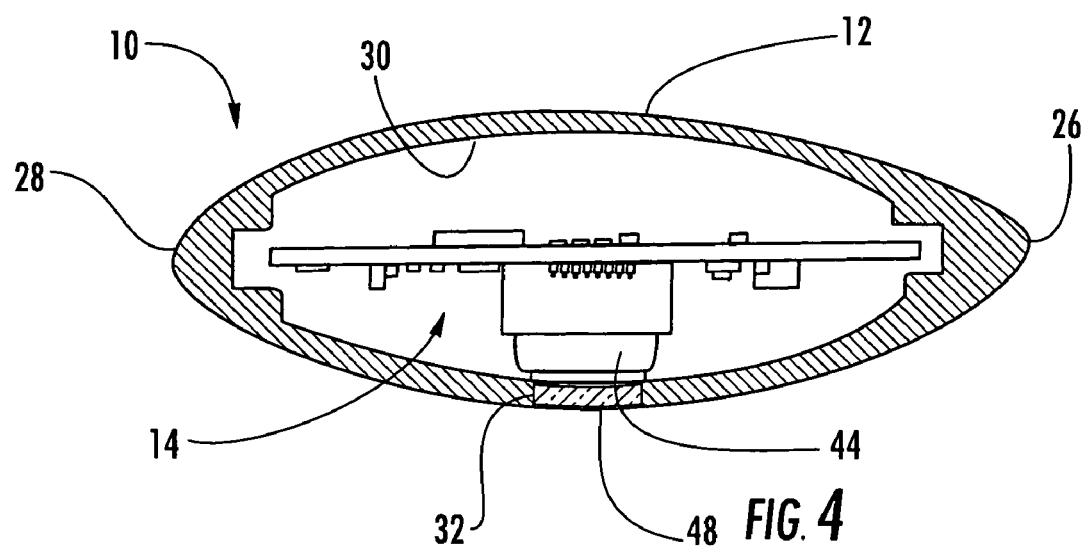
FIG. 4 of the drawings is a top, sectional view of one embodiment of a camera housing of a camera apparatus according to the present disclosure.
Figure 5:
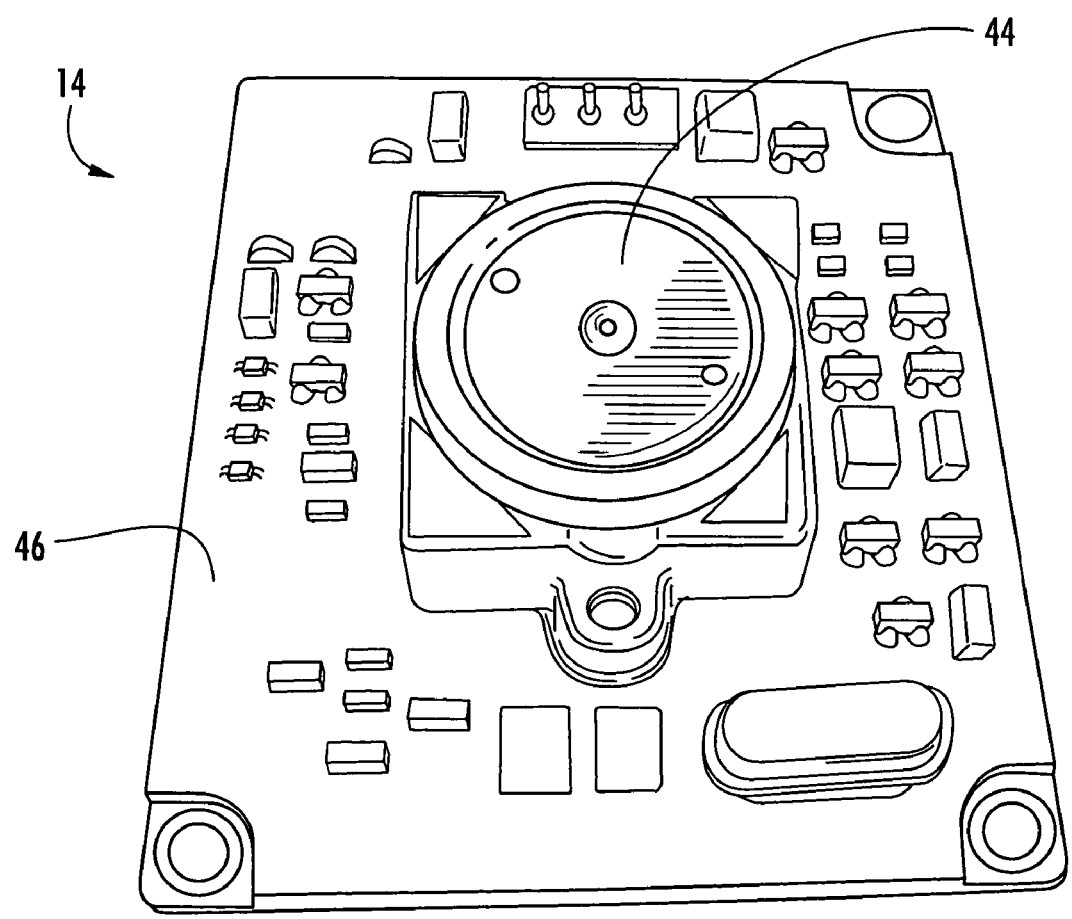
FIG. 5 of the drawings is a perspective view of one embodiment of a camera that can be used with a camera apparatus according to the present disclosure.

FIG. 4 of the drawings illustrates a top sectional view of housing 12 of camera apparatus 10 with housing 12 having an external airfoil configuration. As shown, camera 14 can be positioned within the interior of housing 12 and surrounded by interior wall 30 of housing 12. Camera 14 can face either of the inner side walls of housing 12 depending on which side the field of view is and which side aperture 32 is on. In FIG. 4, aperture 32 is shown for example on an opposite side of housing 12 from its position in FIGS. 1B and 2, and camera 14 therefore faces that direction as well. Camera 14 can comprise any suitable camera for use in association with camera apparatus 10 and can, for example, be a pin-hole type camera. Camera 14 can include a lens 44, and a cover lens such as cover lens 48 can be aligned with and fit into aperture 32. An isolated, perspective view of camera 14 is provided in FIG. 5 of the drawings. In accordance with the present disclosure, epoxy such as epoxy 38 from FIG. 3 can be used to coat at least a portion of a circuit board 46 that is part of camera 14. This epoxy coating can protect the electrical circuitry from water damage.

Figure 6:
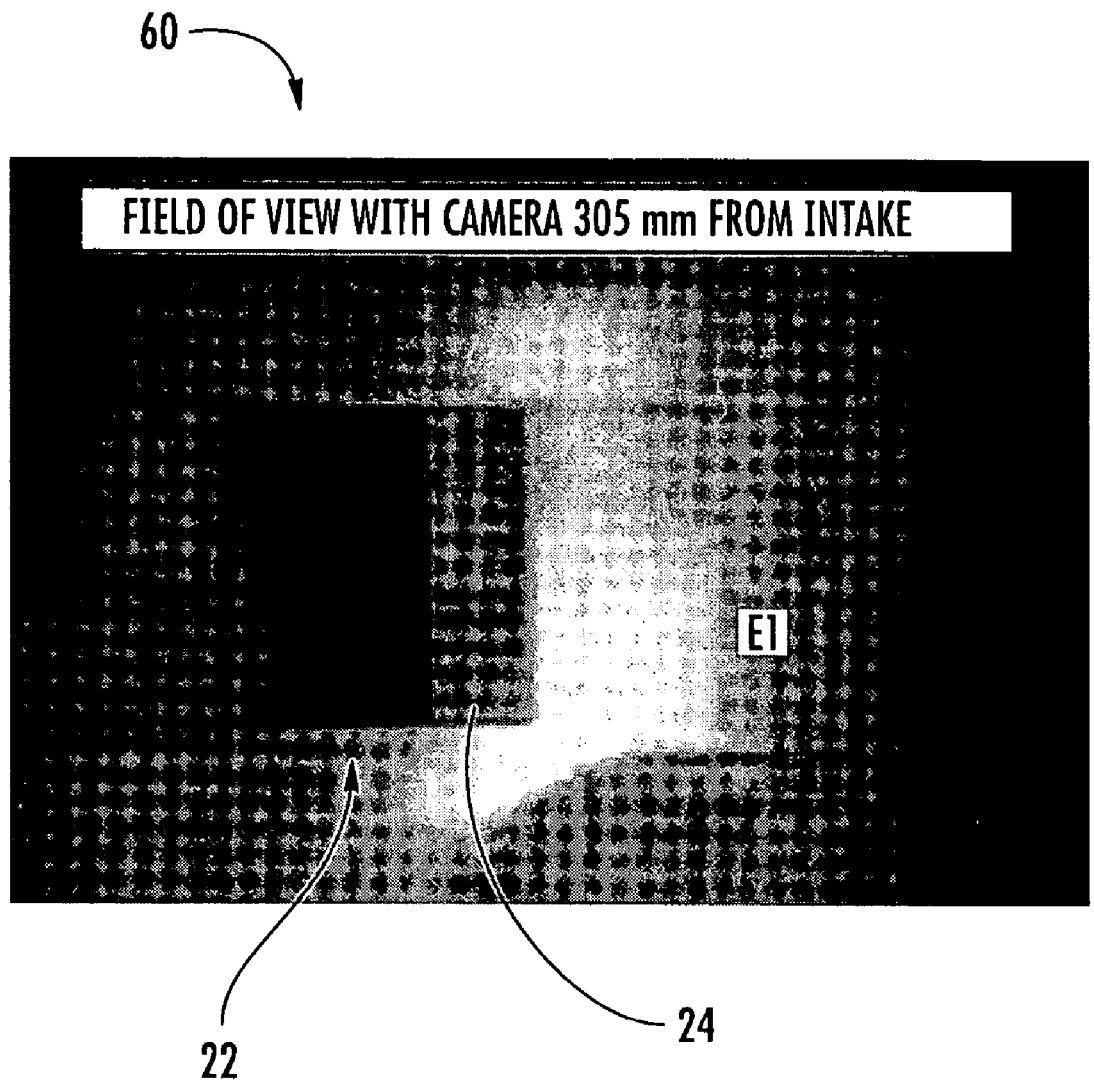
FIG. 6 of the drawings is a sample image from a camera apparatus according to the present disclosure.

FIG. 6 of the drawings is a sample image that can be provided using a camera apparatus such as camera apparatus 10 according to the present disclosure. As shown, camera image generally designated 60 provides an underwater view of water intake 22 of engine E1 where the direction of travel of engine E1 causes water to flow from right to left across water intake 22. Image 60 was taken while engine E1 was operating to move boat B at fifty (50) miles per hour, and image 60 can be provided as a still image or as a video image using camera apparatus 10. As known to those of skill in the art, water intake 22 can include a step designed to cause some water passing by to enter the water intake, typically through a screen such as screen 24. Water intake 22 can, however, be in situations where water may not enter or may only partially enter water intake 22. For example, when a boat such as boat B is operating at high speed, the position of water intake 22 may be out of the water altogether or the speed may cause cavitation such that water is restricted or prevented from entering water intake 22. Also, the position of engine E1 can affect desirable operation and water intake even where speed may be low. Restriction or prevention of water into water intake 22 is undesirable and can cause engine problems. Images, such as image 60 from camera apparatus 10 can therefore provide very helpful monitoring images of water intake 22 and can be used to determine when and how well water is entering water intake 22, even during high-speed operation of boat B.

Figure 7:
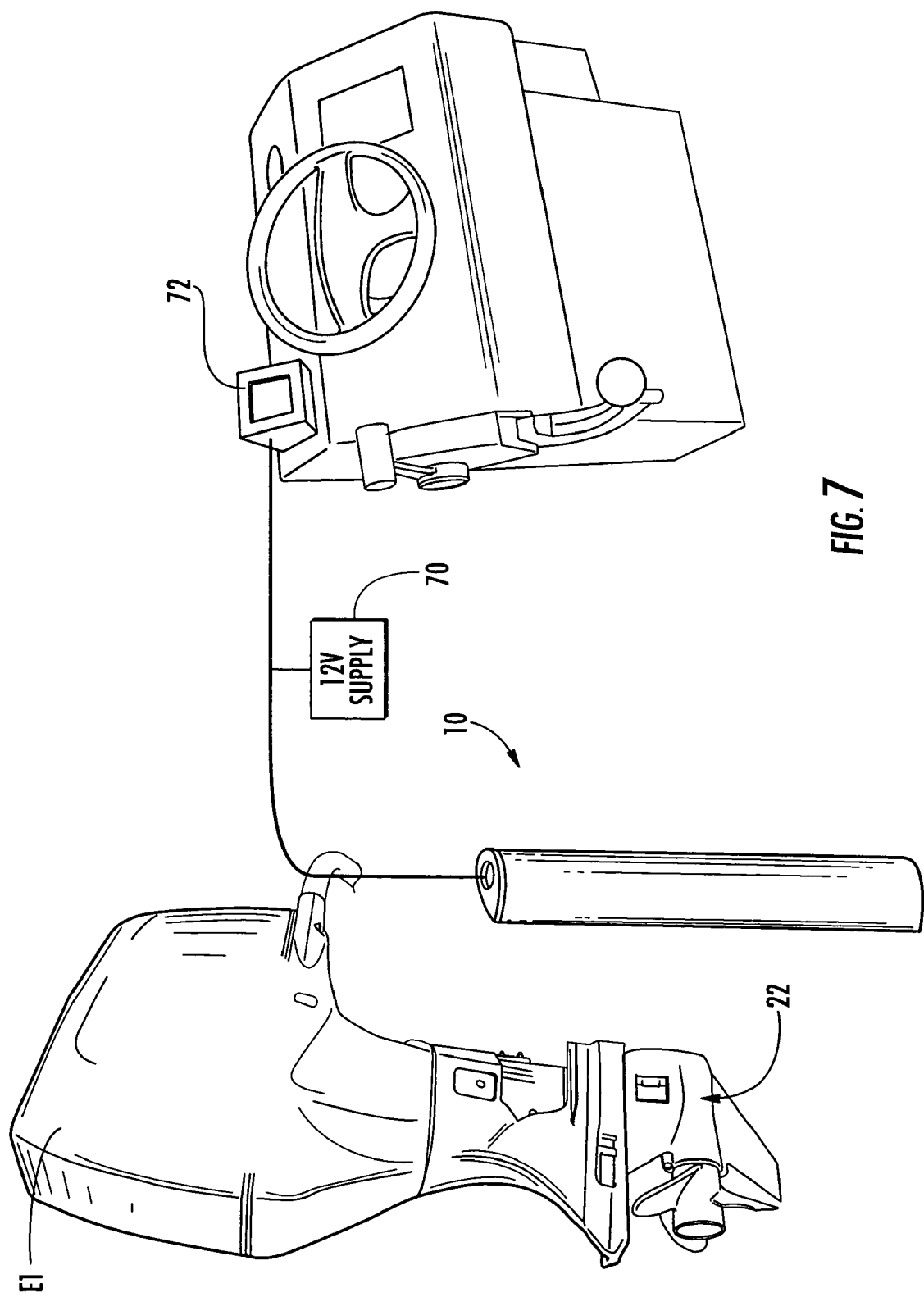
FIG. 7 of the drawings is a diagrammatic illustration of an example of a configuration of a camera apparatus and system according to the present disclosure.

FIG. 7 of the drawings provides a diagrammatic illustration of one example of a possible configuration of a camera apparatus and system according to the present disclosure. As shown, camera apparatus 10 can be electrically connected and can communicate with a power source 70 for providing power to camera 14. The power to the camera itself can be a 12 volt or other suitable power source, such as, for example, a boat's power system. The electrical connection of camera apparatus 10 can also communicate with any suitable display device, such as display 72 for displaying an image or images provided by camera apparatus 10. For convenience, display 72 can be positioned at the helm of a boat in order for an operator of the boat to have immediate access to images provided by camera apparatus 10 while still operating the boat even at high speeds.

Figure 8A:
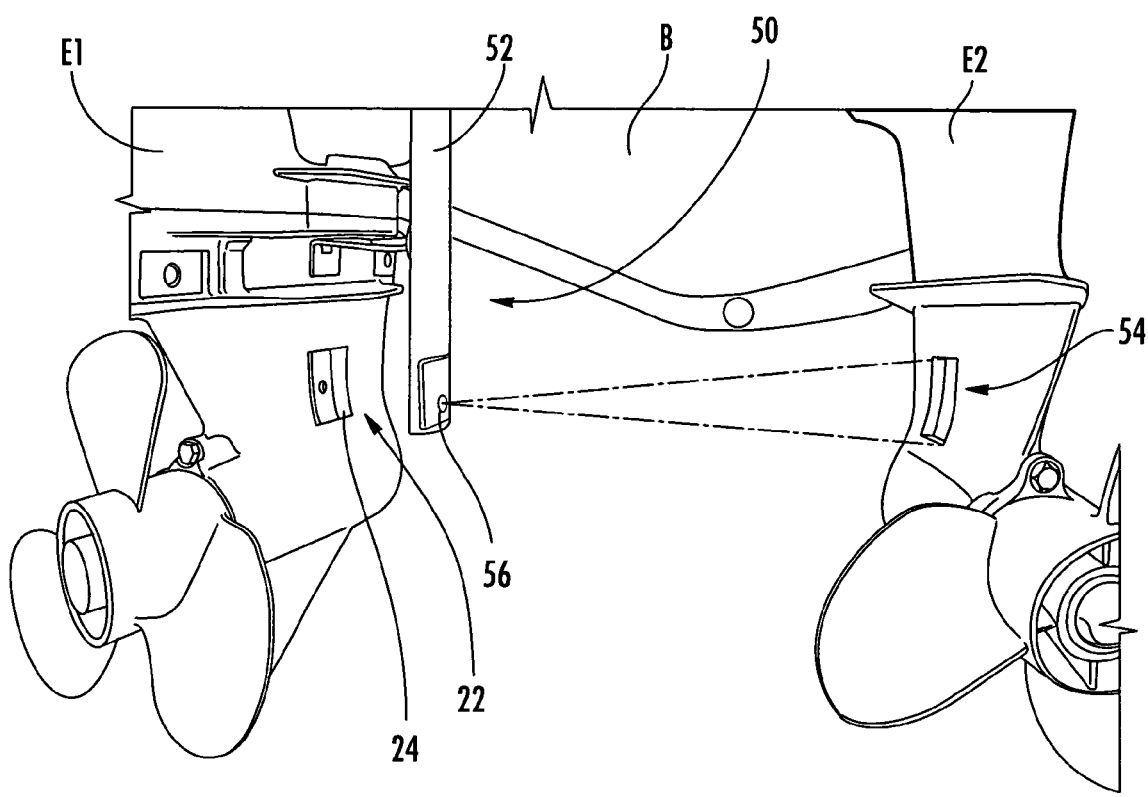
FIGS. 8A and 8B of the drawings are perspective views of another embodiment of a camera apparatus according to the present disclosure.
Figure 8B:
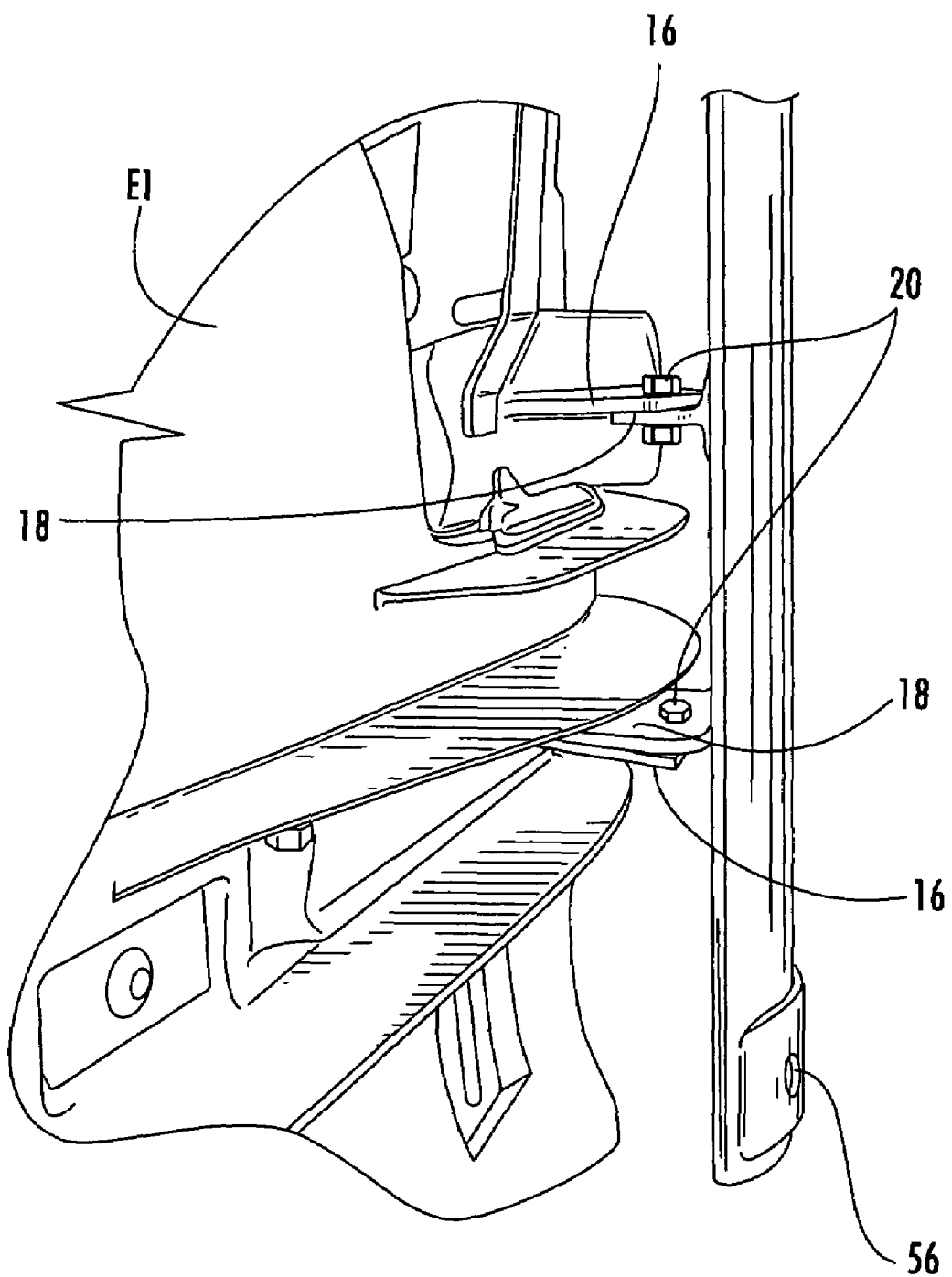

Referring now to FIGS. 8A and 8B of the drawings, another embodiment of a camera apparatus according to the present disclosure is shown. Referring particularly to FIG. 8A, twin outboard engines E1 and E2 are shown attached to the rear of boat B in a spaced-apart manner as can be appreciated by those of skill in the art. In this twin engine configuration, a camera apparatus generally designated 50 as shown can be mounted to engine E1 where a camera (that can be identical to camera 14 described above) within housing 52 of camera apparatus 50 has a field of visual exposure or view toward and of at least a portion of adjacent outboard engine E2. Particularly, camera apparatus 50 can have a field of visual exposure of a water intake generally designated 54 of engine E2. As shown in FIG. 8A, housing 52 of camera apparatus 50 can be essentially identical to camera apparatus 10 as previously described and can be mounted in a like fashion to engine E1. Aperture 56, however, of housing 52 can be located on an opposite side of housing 52 from that previously shown with reference to camera apparatus 10 in order for providing a field of visual exposure toward water intake 54 of engine E2 rather than water intake 22 of engine E1.

It will be understood that various details of the present disclosure may be changed without departing from the scope of the present disclosure. Furthermore, the foregoing description is for the purpose of illustration only, and not for the purpose of limitation.

What is claimed is:

1. A camera apparatus for a marine propulsion mechanism, the camera apparatus comprising:
   (a) a housing having an interior, the housing comprising an exterior airfoil configuration and the housing having a camera viewing aperture that is positioned in relation to the exterior airfoil configuration of the housing to provide visual exposure of at least a portion of a marine propulsion mechanism and to reduce cavitation caused by the housing upon attachment of the housing to a marine vessel; and
   (b) a camera positioned within the interior of the housing wherein the camera is configured to have visual exposure through the camera viewing aperture of the at least a portion of the marine propulsion mechanism upon attachment of the housing to a marine vessel.

2. The camera apparatus of claim 1 wherein the housing comprises a leading edge and an opposite curved surface.

3. The camera apparatus of claim 1 wherein the exterior airfoil configuration of the housing is at least generally symmetrical.

4. The camera apparatus of claim 1 wherein the camera viewing aperture is defined by the housing proximate an end of the housing.

5. The camera apparatus of claim 1 wherein the camera apparatus further comprises a mounting mechanism for mounting the camera apparatus to a structure.

6. The camera apparatus of claim 1 wherein the camera apparatus further comprises a plurality of mounting mechanisms for mounting the camera apparatus to a structure.

7. The camera apparatus of claim 6 wherein the mounting mechanisms each comprise a mounting arm for attachment to a marine propulsion mechanism.

8. The camera apparatus of claim 1 wherein an air vent is in communication with the interior of the housing.

9. The camera apparatus of claim 1 wherein the exterior of the housing is adapted for minimizing or eliminating cavitation from the camera apparatus.

10. A camera apparatus for use with a marine propulsion mechanism, the camera apparatus comprising:
    (a) a marine propulsion mechanism for generating propulsion; and
    (b) a camera apparatus attached to the marine propulsion mechanism, the camera apparatus comprising:
       (i) an elongated housing having an interior, and the housing having a camera viewing aperture; and
       (ii) a camera positioned within the interior of the housing wherein the camera can have visual exposure through the camera viewing aperture;
    wherein the camera apparatus is attached to the marine propulsion mechanism wherein the camera can have visual exposure of at least a portion of the marine propulsion mechanism.

11. The camera apparatus of claim 10 wherein the housing of the camera apparatus comprises an exterior airfoil configuration.

12. The camera apparatus of claim 10 wherein the exterior airfoil configuration of the housing is generally symmetrical.

13. The camera apparatus of claim 10 wherein the housing comprises a leading edge and an opposite curved surface.

14. The camera apparatus of claim 10 wherein the camera viewing aperture is defined by the housing proximate an end of the housing.

15. The camera apparatus of claim 10 wherein the camera apparatus further comprises a mounting mechanism for mounting the camera apparatus to the marine propulsion mechanism.

16. The camera apparatus of claim 15 wherein the camera apparatus further comprises a plurality of mounting mechanisms for mounting the camera apparatus to the marine propulsion mechanism.

17. The camera apparatus of claim 16 wherein the mounting mechanisms each comprise a mounting arm for attachment to a marine propulsion mechanism.

18. The camera apparatus of claim 10 wherein the camera apparatus is attached to the marine propulsion mechanism wherein the camera can have visual exposure of a water intake of the marine propulsion mechanism.

19. The camera apparatus of claim 10 wherein an air vent is in communication with the interior of the housing.

20. A camera apparatus for use to monitor a water intake of a marine outboard engine, the camera apparatus comprising:
    (a) an elongated housing defining an interior, the housing comprising an exterior airfoil configuration that is mounted to a marine outboard engine;
    (b) a camera positioned within the interior of the housing wherein the camera has visual exposure through a camera viewing aperture of the housing and wherein the field of visual exposure comprises a water intake of the marine outboard engine; and
    (c) an electronic display in communication with the camera for displaying images from the camera.

21. A method of monitoring a marine propulsion mechanism, the method comprising:
    (a) providing a camera apparatus comprising:
       (i) a housing having an interior, the housing comprising an exterior airfoil configuration and the housing having a camera viewing aperture; and
       (ii) a camera positioned within the interior of the housing wherein the camera can have visual exposure through the camera viewing aperture of a marine propulsion mechanism; and
    (b) observing an image from the camera apparatus.

22. The method of claim 21 wherein observing an image from the camera apparatus comprises observing an underwater image of a water intake of a marine propulsion mechanism.

23. The method of claim 21 wherein observing an image from the camera apparatus comprises observing an underwater image of cavitation caused by a marine propulsion mechanism.

24. A method of monitoring a marine propulsion mechanism, the method comprising:
    (a) mounting a camera apparatus to a marine propulsion mechanism, the camera apparatus comprising:
       (i) a housing having an interior, the housing comprising an exterior airfoil configuration and the housing having a camera viewing aperture; and (ii) a camera positioned within the interior of the housing wherein the camera has visual exposure through the camera viewing aperture of a marine propulsion mechanism; and (b) observing an image from the camera apparatus.

25. The method of claim 24 wherein observing an image from the camera apparatus comprises observing an underwater image of a water intake of the marine propulsion mechanism.

26. The method of claim 24 wherein observing an image from the camera apparatus comprises observing an underwater image of cavitation caused by the marine propulsion mechanism.

27. A method of monitoring a water intake of an engine of a boat, the method comprising:

(a) mounting a camera apparatus to a boat engine wherein a camera of the camera apparatus has visual exposure to a water intake of the boat engine; and (b) observing an image of the water intake boat engine from the camera while the boat engine is moving through water.

28. The method of claim 27 further comprising maintaining the camera apparatus in a position slightly off of parallel to a flow of water past the camera apparatus.

* * * * *

UNITED STATES PATENT AND TRADEMARK OFFICE
CERTIFICATE OF CORRECTION

PATENT NO.       : 7,599,614 B2                          Page 1 of 1
APPLICATION NO.  : 11/378728
DATED            : October 6, 2009
INVENTOR(S)      : Mark R. Droubie It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 610 days.

Signed and Sealed this

Twenty-eighth Day of September, 2010

David J. Kappos
*Director of the United States Patent and Trademark Office*